Sept. 3, 1935.  A. LEIB  2,013,001
TRANSMITTER
Filed Aug. 9, 1933
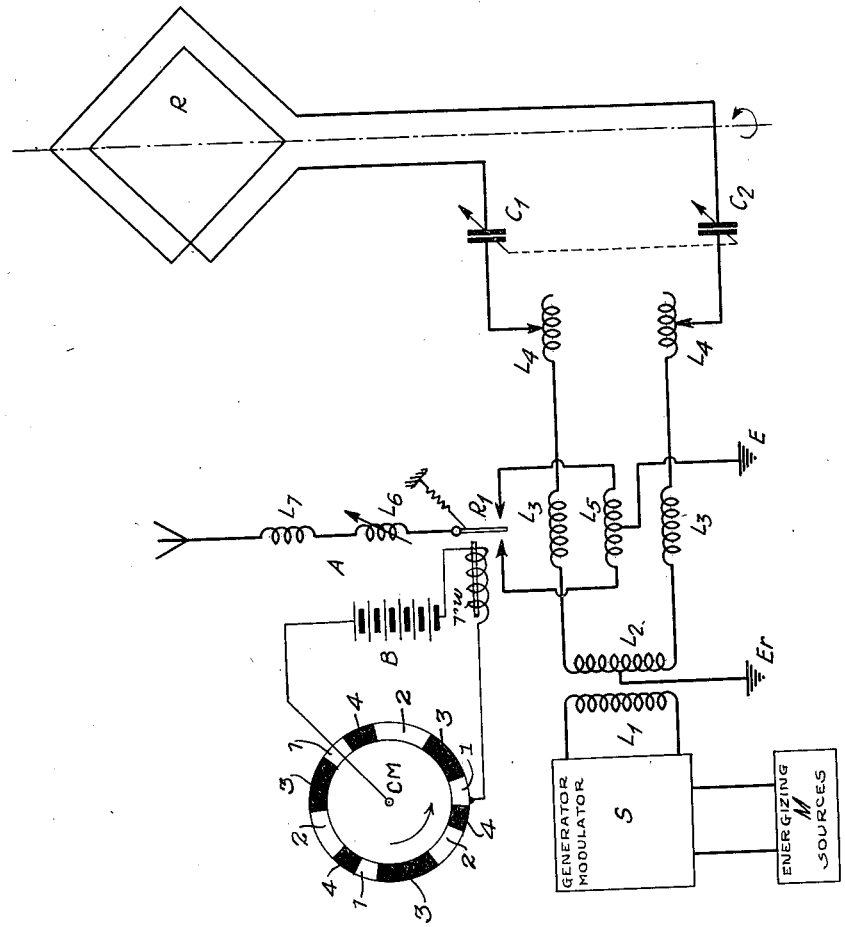
INVENTOR
*AUGUST LEIB*
BY
ATTORNEY Patented Sept. 3, 1935

2,013,001

UNITED STATES PATENT OFFICE 2,013,001

TRANSMITTER

August Leib, Berlin, Germany, assignor to Telefunken Gesellschaft fur Drahtlose Telegraphie m. b. H., Berlin, Germany, a corporation of Germany Application August 9, 1933, Serial No. 684,364
In Germany July 25, 1932

4 Claims. (Cl. 250—11)

In United States application Serial No. 617,159½, filed June 14, 1932, it has been suggested, for the purpose of piloting aerial and marine vessels and craft, to dispose the sending antenna in such a way that by the combined radiations of a directional and a non-directional antenna, a guiding plane or a guiding line is formed in such a way that the relative sense of connection of the two antennæ is rhythmically reversed while optionally characterizing each connection in a definitely identifiable manner, for instance, by the aid of complementary signals or impulses so that equality of reception of the two signals will indicate the guide or piloting plane or path.

For the purpose of insuring blind landings, the suggestion has been made in patent application No. 660,129, filed March 9, 1933, to mount about the middle of the landing field or airport an antenna capable of sending out an electromagnetic wave, the vertical diagram of which constitutes a cup-shaped surface of rotation having its axis of revolution perpendicular upon the ground so that a meridian of the said surface may be used as a landing curve.

The present invention involves a new and simplified transmitting system for guiding aircraft to a safe landing at any time and in particular at periods of low visibility. The system, which includes the novel features of the devices described above and additional novel features, will be understood from the following detailed description thereof and therefrom when read in connection with the attached drawing, in which the single figure shows, for purposes of illustration, a simplified transmitting system, by means of which the energy waves necessary to guide an aircraft to a safe landing may be radiated.

According to the present invention, the above ideas as before disclosed and described are combined. In other words, according to this invention, I first employ a non-directional antenna, if desired, of the ultra-short wave type, having a cup-shaped radiation diagram whose points of definite and constant field intensity lie along an imaginary surface, the lowermost meridians of which constitute a landing path. Then, too, there is employed a directional antenna operating on the same frequency. The relative sense of connection of the two antennæ is rhythmically reversed so that two cardioidal radiations are produced alternately and with equal, though differently directive effects and with opposite axes of symmetry. If to each sense of connection of the antenna assembly or combination there is co-ordinated a definite identification sign or signal, for instance, if their reversals occur at the rhythm of signals which are complementary to each other, or if they distinguish themselves by dissimilar modulating frequencies at one and the same modulation percentage, then, by the aid of a receiver which feeds both an indicator for the mean incoming field intensity, for following the landing curve or the so-called "glide path", as well as an indicator adapted to compare the incoming energies, for direction control in landing, the descent upon a meridian of the landing surface is readily accomplishable. In this scheme the course or direction indicator, which may be either acoustic or optical in nature, must indicate equality of receptions or volumes originating from the two cardioidal radiations, whereas the other indicator or reading instrument which serves to measure the mean incoming energy must constantly indicate the incoming volume coordinated to the landing curve.

If the airplane is still outside the landing plane, the compass direction of which is imparted to the aircraft suitably by radio telegraphy prior to landing, then, in order to tell the direction of landing, predominance of reception in the said apparatus due to the particular radiation whose axis of symmetry is at closer proximity to the aircraft, will indicate and reveal the actual position of the aircraft at a given time in reference to the guide or directive plane. If the switching frequency is appropriately chosen, then the index of the landing curve will not be stationary, but be subject to oscillations.

This last mentioned indicator may suffice inasmuch as the same distinguishes and indicates not only the position of the aircraft in the directional plane, by means of constant needle deflections, but also its location outside the guide plane, by oscillating deflections. Inasmuch as the compass direction of the landing plane has been given by radio signalling, this one indicator in conjunction with an instrument board compass might be adequate for finding and following the glide path. In this connection, it is not absolutely necessary to distinguish the two radiations by choosing dissimilar complementary signals.

The meridian of the cup-shaped radiation diagram of the non-directive aerial to be used in any given instance or effecting a landing lies in the directive plane, which is positioned at right angles to the axis of symmetry of the two cardioids. In order that landing may always be accomplishable against the wind, it is necessary to make conditions so that the said landing plane may always be oriented according to the direction of the wind. Indeed, all that is necessary to that end is to dispose the directional aerial adjustable either manually or automatically in accordance with the prevalent direction of the wind. A landing system of this kind offers the advantage of maximum simplicity. In the same the pilot is informed of the landing curve as well as the direction of landing by one and the same frequency, transmitter wave. As a result the demand for waves for the entire organization of airplane radio navigation service is far smaller than in the case of other landing systems in which separate sending frequencies are employed for the landing curve and for the sense of landing. Also the equipment on board the plane is simplified.

The transmitting system of the present invention may comprise a nondirectional antenna A adapted to be connected by way of a contact $R_1$ symmetrically grounded in opposite senses to the inductance $L_5$. The antenna A may be of the ultra-short wave type or of any type which produces cup-shaped radiation, as described more in detail in United States application No. 660,129, filed March 9, 1933. A rotatable directional antenna R is connected by way of tuning condensers $C_1$, $C_2$ and variable tuning inductances $L_4$ and coupling inductances $L_3$ to a symmetrically grounded inductance $L_2$.

The antenna systems may be energized by high frequency oscillations from an inductance $L_1$ connected to a generator in S. The oscillations included in S may be modulated by modulating potentials produced therein or supplied from the unit M which includes other elements of the transmitter equipment. Grounding of the inductance $L_2$ at ER prevents the setting up of unbalanced vertical aerial effect in the directional aerial system and associated circuits due to the capacity of the loop system R.

The aerial A may be tuned by the inductance $L_6$ and may include a load coil $L_7$. When the inductance $L_1$ is energized and the vertical aerial A is connected to the inductance $L_5$ by way of its contacts, energy which may be represented by a cardioid diagram will be radiated from the system provided both aerials thereof are tuned properly. The maximum amount of radiation will be in a direction determined by the sense of coupling between the aerial A and the inductance $L_5$. This sense of coupling may be reversed by manipulating the movable contact member $R_1$ between the two fixed contact points. Movement of the movable contact member may be accomplished in any manner. For example, the said member may be actuated by a relay winding $rw$ connected with a control means CM comprising a rotatable wheel having conductive segments 1, 2 and non-conductive segments 3, 4. In one position of the movable contact $R_1$ the code letter A may be sent out. In the other position of the contact $R_1$ the code letter N may be sent out. In the arrangement shown, when the brush passes over the conductors 1 and 2 the switch $R_1$ is moved towards the left to form Morse signal A. When the brush passes over non-conductive segments 3 and 4 the switch $R_1$ is swung by the spring to the right to form the Morse letter N. The code letters A and N may be impressed on the oscillations in S from a source therein or from the control apparatus M. In either case the control means CM (which under these circumstances controls the position of $R_1$ only) and the keying of the oscillations from S must be coordinated so that the code letters are sent out when the movable member $R_1$ is in the proper position.

Having thus described my invention and the operation thereof, what I claim is:

1. A transmitting apparatus comprising, a radiator adapted to radiate energy which may be represented by a cup-shaped radiation diagram, a loop aerial, an inductance symmetrically connected to ground, a connection between each terminal of said inductance and a different terminal of said loop aerial, each of said connections including a coupling inductance, an additional inductance symmetrically connected to ground and coupled to both of said coupling inductances, a fixed contact connected to each terminal of said additional inductance, a movable contact for alternately connecting said radiator to the contacts connected with the terminals of said additional inductance, and a source of signal modulated high frequency oscillations coupled to said first named symmetrically grounded inductance.

2. A device as recited in claim 1 in which a control means including a magnet cooperates with said movable contact to alternately connect said vertical aerial to different terminals of said symmetrically grounded coupling inductance, and in which said control means is coordinated with said modulating means so that different signals are transmitted in different positions of said movable contact.

3. A radiant energy transmitting system comprising, a directional aerial having one or more conductive turns, a vertical aerial, means for tuning each of said aerials to the same frequency, a reactance symmetrically coupled to said directional aerial to form with the turns thereof a closed circuit, a second reactance, a reversible connection between the terminals of said second reactance and said vertical aerial, a source of energy of carrier wave frequency, and circuits coupling said source of energy of carrier wave frequency to said directional aerial and to said second named reactance to impress energy from said source on said directional aerial and on said vertical aerial by way of said second named reactance.

4. Directional transmitting apparatus including means for reversing the character of the transmission at a signalling rate comprising, a directive energy radiating system adapted to radiate energy which may be represented by a lemniscate, a reactance coupled to said directive system to form therewith a circuit, a second energy radiating system arranged when energized to radiate energy which may be represented by a cup shaped field, a second reactance, a source of carrier wave energy, circuits coupling said source to both of said reactances, and a switching device comprising contacts connected with said second named reactance and a movable member connected to said second named radiating system to connect the same alternately to opposite ends of said second reactance, whereby said radiators are energized to produce superimposed fields and the sense of one of said fields may be reversed.

AUGUST LEIB.